(12) United States Patent
Dasa et al.

(10) Patent No.: US 12,197,527 B2
(45) Date of Patent: Jan. 14, 2025

(54) REUSABLE CAPABILITY COMPONENT SHARED BY MULTIPLE WEB APPLICATIONS

(71) Applicant: Capital One Services, LLC, McLean, VA (US)

(72) Inventors: Venkata Sudharsan Dasa, Frisco, TX (US); Jonathan Ricklis, Richardson, TX (US)

(73) Assignee: Capital One Services, LLC, McLean, VA (US)

(*) Notice: Subject to any disclaimer, the term of this patent is extended or adjusted under 35 U.S.C. 154(b) by 63 days.

(21) Appl. No.: 17/308,378

(22) Filed: May 5, 2021

(65) Prior Publication Data
US 2022/0358179 A1    Nov. 10, 2022

(51) Int. Cl.
G06F 17/00      (2019.01)
G06F 16/957     (2019.01)
G06F 16/958     (2019.01)

(52) U.S. Cl.
CPC ........ *G06F 16/9577* (2019.01); *G06F 16/958* (2019.01)

(58) Field of Classification Search
CPC ..................... G06F 16/9577; G06F 16/958
(Continued)

(56) References Cited

U.S. PATENT DOCUMENTS 8,533,336 B1 *  9/2013  Scheffler ............. G06F 9/452
                                                     717/177
10,534,851 B1 *  1/2020  Chan ................. G06Q 30/0255
(Continued)

FOREIGN PATENT DOCUMENTS

CN      109597610 A       4/2019
CN      110502912 A  * 11/2019   ........... G06F 21/604
(Continued)

OTHER PUBLICATIONS

Michael Szczepanik; Backend for frontend (BFF) pattern—why do you need to know it?; Oct. 25, 2021; medium.com; pp. 1-11.*
(Continued)

*Primary Examiner* — Laurie A Ries
(74) *Attorney, Agent, or Firm* — Sterne, Kessler, Goldstein & Fox P.L.L.C.

(57) ABSTRACT

System, apparatus, device, method and/or computer program product are disclosed for sharing a reusable capability component among multiple web applications. A device is configured to operate a web browser to load at least a portion of a first web application and render a page of the first web application to be displayed on a display device. The page includes a placeholder to indicate a placement for a reusable capability component including a frontend component and an associated backend component. The frontend component and the backend component of the reusable capability component can form an independent web application that can be used by the first and a second web application. Upon detection of a user navigation on the placeholder, the device loads, from a server, the frontend component of the reusable capability component to be rendered and placed within the page according to the placement indicated by the placeholder.

20 Claims, 7 Drawing Sheets

(58) Field of Classification Search
USPC .......................................................... 715/234
See application file for complete search history.

(56) References Cited

U.S. PATENT DOCUMENTS

| | | | | |
|---|---|---|---|---|
| 10,831,988 | B2* | 11/2020 | Chitale | G06F 16/986 |
| 11,080,354 | B2* | 8/2021 | Chugh | G06F 16/972 |
| 11,321,422 | B1* | 5/2022 | Stone | G06F 3/0486 |
| 11,789,963 | B2* | 10/2023 | Banerjee | G06F 16/955 |
| | | | | 707/705 |
| 11,966,791 | B2* | 4/2024 | Darling | G06F 8/70 |
| 2004/0216042 | A1* | 10/2004 | Consolatti | G06F 8/30 |
| | | | | 715/234 |
| 2007/0136320 | A1* | 6/2007 | Sah | G06Q 30/02 |
| 2007/0283020 | A1* | 12/2007 | Chowdary | G06F 16/958 |
| | | | | 709/227 |
| 2010/0031147 | A1* | 2/2010 | Williams | G06F 16/958 |
| | | | | 715/716 |
| 2014/0281884 | A1* | 9/2014 | Burckart | G06F 16/972 |
| | | | | 715/234 |
| 2015/0026573 | A1* | 1/2015 | Meng | G06F 8/61 |
| | | | | 715/716 |
| 2016/0140251 | A1* | 5/2016 | Schaus | G06F 16/9577 |
| | | | | 715/234 |
| 2017/0109455 | A1* | 4/2017 | Berk | G06F 16/3344 |
| 2017/0154017 | A1* | 6/2017 | Kristiansson | G06F 40/143 |
| 2018/0349149 | A1* | 12/2018 | Chute | G06F 9/45529 |
| 2018/0349485 | A1* | 12/2018 | Carlisle | G06F 16/9535 |
| 2019/0065487 | A1* | 2/2019 | Olsson | G06F 16/957 |
| 2019/0069124 | A1* | 2/2019 | Labrecque | G06F 16/958 |
| 2020/0019414 | A1* | 1/2020 | Byard | G06F 9/44526 |
| 2020/0249921 | A1* | 8/2020 | Giandomenico | G06F 8/10 |
| 2022/0114214 | A1* | 4/2022 | Reddymakireddy | |
| | | | | G06F 9/44521 |

FOREIGN PATENT DOCUMENTS

| | | | | |
|---|---|---|---|---|
| CN | 111176627 | A | | 5/2020 |
| CN | 111324346 | A | | 6/2020 |
| CN | 111488145 | A | | 8/2020 |
| CN | 111581576 | A | | 8/2020 |
| CN | 111737032 | A | | 10/2020 |
| CN | 109335572 | B | * | 8/2024 ........... B65G 25/065 |

OTHER PUBLICATIONS

Route; Jun. 2, 2020; merriam-webster.com; pp. 1-6.*
Placeholder; Jan. 18, 2021; merriam-webster.com; pp. 1-4.*

* cited by examiner

REUSABLE CAPABILITY COMPONENT SHARED BY MULTIPLE WEB APPLICATIONS

BACKGROUND

A web application, also referred to as a web app or web software, is application software that runs on a web server, different form standalone software programs or applications that run locally on the operating system of a computing device. Web applications are often viewed as a website and accessed by a user through a web browser with an internet connection. Web applications have fundamentally changed the society. Commonly-used web applications, e.g., webmail, online retail sales, online banking, and online auctions, have made daily lives much easier compared to not too long ago.

Web applications are programmed using a client-server model, where a user or a client is provided services through a server that is often hosted remotely. The part of a website or a web application that user interacts with directly is termed as the frontend of the web application, and are provided by front-end code executed on the client side, operated in the user's browser to create the user interface. On the other hand, the backend of the web application includes code that runs on the server to receive requests from the clients, and contains the logic to send the appropriate data back to the clients. The backend often includes a database, which persistently stores the data for the web application. Due to the complexity in both frontend and backend, it is often very expensive to build large scale web applications. It is still a great challenge to build web applications in an efficient way.

BRIEF SUMMARY

Disclosed herein are system, apparatus, device, method and/or computer program product embodiments, and/or combinations and sub-combinations thereof for sharing a reusable capability component among multiple web applications to reduce the cost and improve the efficiency for developing web applications, in addition to improve the efficiency and speed of the web applications.

In some examples, a device can include a display device and a processor coupled to the display device. The display device can be configured to display a first page of a first web application rendered by a web browser at runtime of the first web application. The first page can include a route to load a reusable capability component, and a first placeholder to indicate a first placement for the reusable capability component to be loaded into the first page. The first placement indicated by the first placeholder can include a column, a layer, a frame, an area, or other placement parameters, which determine the placement of the reusable capability component in the first page.

In some examples, the processor can be configured to operate the web browser to load at least a portion of the first web application and render the first page of the first web application to be displayed on the display device. The processor is further configured to detect a first user navigation to the first placeholder within the first page at the runtime of the first web application. Upon the detection of the first user navigation, the processor is configured to load, from a server communicatively coupled to the device, a frontend component of the reusable capability component to be rendered by the web browser and placed within the first page according to the first placement indicated by the first placeholder.

In some examples, the reusable capability component is configured to be reusable by a second web application. The second web application can be a web application different from the first web application, or a part of the first web application. The reusable capability component includes the frontend component and a backend component associated with the frontend component to provide data and functions for the frontend component. In some examples, the frontend component and the backend component of the reusable capability component can form an independent web application.

In some examples, when the second web application is different from the first web application, the processor is further configured to operate the web browser to load the second web application and render a second page of the second web application at runtime of the second web application. The second page of the second web application includes the route to load the reusable capability component, and a second placeholder to indicate a second placement within the second page for the reusable capability component. In addition, the processor is configured to detect a second user navigation to the second placeholder within the second page at the runtime of the second web application. Upon the detection of the second user navigation, the processor is configured to load the frontend component of the reusable capability component from the server. The frontend component of the reusable capability component is to be rendered by the web browser and placed within the second page according to the second placement indicated by the second placeholder.

In some examples, the reusable capability component can have different versions. The frontend component of the reusable capability component loaded into the first page of the first web application is a first version of the frontend component of the reusable capability component that is associated with a first version of the backend component of the reusable capability component. In addition, the frontend component of the reusable capability component loaded into the second page of the second web application is a second version of the frontend component of the reusable capability component that is associated with a second version of the backend component of the reusable capability component. The first version of the frontend component includes at least an element that is not included in the second version of the frontend component, or the first version of the backend component includes at least a data or function that is not included in the second version of the backend component. Furthermore, the first version of the frontend component, the second version of the frontend component, the first version of the backend component, and the second version of the backend component are controlled by a configuration file stored in a database on the server. The configuration file determines to supply the first version of the frontend component and the first version of the backend component to the first web application based on characteristics of the first web application.

In some examples, the first page of the first web application can further include one or more elements rendered within the first page, where the one or more elements are different from the first placeholder. The one or more elements can include at least a tab or a menu item. When the one or more elements includes at least a tab or a menu item, the first placeholder can be activated when the tab or the menu item is selected, and the frontend component of the reusable capability component can be loaded and rendered by the web browser and placed within the first page according to the first placement indicated by the first placeholder.

In some examples, there can be multiple placeholders within the first page of the first web application. For example, the first page can further include a second placeholder to indicate a second placement of a second reusable capability component, wherein the first placement is different from the second placement. The first placeholder can be a parent placeholder to indicate the first placement of a parent reusable capability component. The parent placeholder further includes a child placeholder within the parent placeholder, where the child placeholder indicates a placement of a child reusable capability component.

In some examples, the frontend component of the reusable capability component can include elements created using languages including Hypertext Markup Language (HTML), Extensible Hyper Text Markup Language (XHTML), Dynamic HTML (DHTML), Cascading Style Sheets (CSS), JavaScript™, or a scripting language. In addition, the backend component of the reusable capability component can be created using language including Structured Query Language (SQL™), MySQL™, Hypertext Preprocessor (PHP™), Python™, Ruby on Rails™, Java™, or ASP.NET™. The web browser can include Google Chrome™, Mozilla Firefox™, Microsoft Edge™, Jio-Browser™, Opera Mini™, Internet Explorer™, Opera Mobile™, Baidu™, NetSurf Safari™, or some other web browser. The device can include a smart phone, a laptop, a tablet, a personal assistant, a monitor, a wearable device, an Internet of Thing (IoT) device, a mobile station, a subscriber station, a desktop, a server, a remote terminal, a wireless terminal, or a user device.

In some examples, a method can be performed by a device to operate a first web application by a web browser. The method can include loading at least a portion of the first web application by the web browser, and rendering a page of the first web application to be displayed on a display device. The page can include a placeholder to indicate a placement for a reusable capability component and a route to load the reusable capability component. The reusable capability component is reusable by a second web application. The method further includes detecting a user navigation to the placeholder within the page at the runtime of the first web application. Upon the detection of the user navigation, the method includes loading from a server communicatively coupled to the device, a frontend component of the reusable capability component to be rendered by the web browser and placed within the page according to the placement indicated by the placeholder. The reusable capability component includes the frontend component and a backend component associated with the frontend component to provide data and functions for the frontend component. The frontend component and the backend component of the reusable capability component can form an independent web application.

A non-transitory computer-readable medium having instructions stored thereon that, when executed by at least one computing device, cause the at least one computing device to perform operations to operate a first web application by a web browser. The operations include loading at least a portion of the first web application by a web browser, and rendering a page of the first web application to be displayed on a display device. The page includes a placeholder to indicate a placement for a reusable capability component and a route to load the reusable capability component. The operations further include detecting a user navigation to the placeholder within the page at the runtime of the first web application. Upon the detection of the user navigation, the operations include loading, from a server communicatively coupled to the device, a frontend component of the reusable capability component to be rendered by the web browser and placed within the page according to the placement indicated by the placeholder. The reusable capability component includes the frontend component and a backend component associated with the frontend component to provide data and functions for the frontend component. The frontend component and the backend component of the reusable capability component can form an independent web application. The reusable capability component is configured to be reusable by a second web application.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
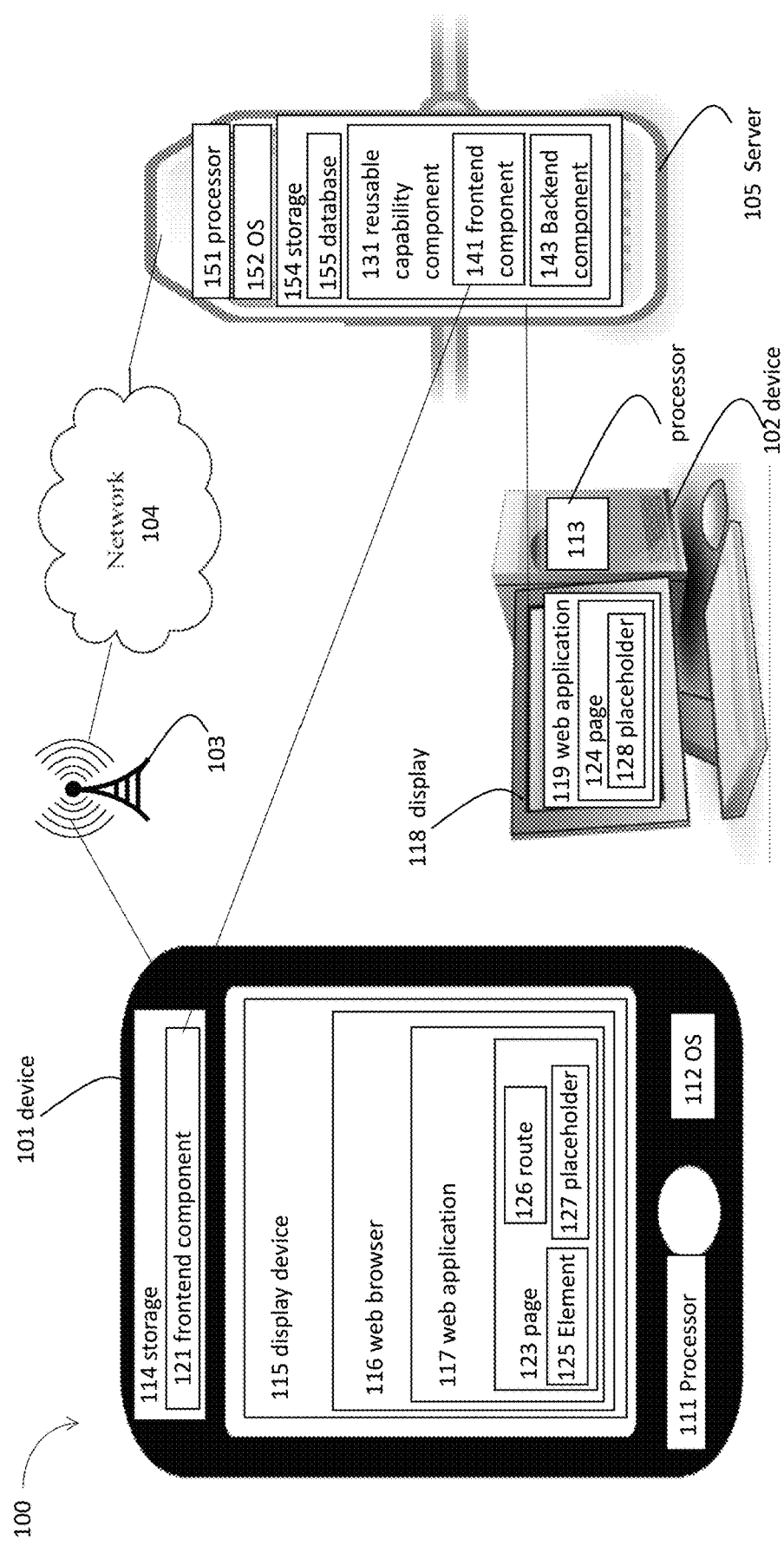
FIG. 1 illustrates a block diagram of a system for sharing a reusable capability component among multiple web applications, according to an embodiment of the disclosure.

The disclosed embodiments is related to sharing a reusable capability component among multiple web applications. Web applications are programmed using a client-server model, where a user or a client is provided services through a server that is often hosted remotely. A web application can include a frontend component that interacts with a user directly, and a backend component including code that runs on the server to receive requests from the clients and contains the logic to send the appropriate data back to the clients.

Web applications are often viewed as websites to provide services, products, and experiences to users. Sometimes, a business can provide similar products to consumers through different web applications or different parts of a web application. For example, a web application providing car sales to customers may share many similar functions with a web application providing truck sales to customers. In some examples, a web application can include a part to perform car sales to customers, and another part to perform truck sales to customers. It can cost twice as much if the web application or the part of a web application for car sales is developed independently from the web application or the part of a web application for truck sales. Costs can be reduced when similar functions and logic can be shared between the two web applications or two parts of a web application.

In the context of web applications, some design may build a monolithic web application, where a part of code of the web application can be turned on or off depending on the context of usage of the web application. However, such a monolithic web application can result in a collection of code for different context, which is larger than any single web application, and hence with high cost. Another approach is to decompose a web application into components and develop the components independently as libraries. Multiple libraries can be bundled at build time before being deployed to the client or the server for operations. However, such reusable libraries normally are for the frontend only or the backend only, and further need to be customized for new functionalities, resulting in high cost for building multiple web applications.

The current disclosure discloses techniques for sharing a reusable capability component among multiple web applications. A reusable capability component is independently developed as a part of a web application, providing a capability to a user for a product or a service, hence referred to as a reusable capability component. A reusable capability component can include a frontend component to provide user interaction to the user, and a backend component associated with the frontend component to provide data and functions for the frontend component. Hence, the frontend component and the backend component of the reusable capability component can form an independent web application. Accordingly, variables and parameters of the reusable capability component are independent of variables or parameters of other parts of the web application, which can provide a higher level of independence compared to the library based software component sharing or the monolithic web application. Furthermore, such a reusable capability component is loaded into a web application directly only when needed at runtime of the web application. Therefore, operations of such a reusable capability component are independent from other parts of the web application and/or can be reused by other web applications.

The embodiments disclosed herein present improvements in the functions of a web application. In some examples, a web application, which can be referred to as a full web application, can be divided into a shell web application including one or more placeholders for one or more reusable capability components, and one or more reusable capability components. The shell web application including the one or more placeholders can be simpler and smaller than the full web application. Hence, it can be faster to deploy the shell web application to the clients. The reusable capability components are not loaded unless when needed. Therefore, the operations of the shell web application can be faster on the client device. In the description below, depending on the context, a web application can be used to refer to either a shell web application containing at least a placeholder, or a full web application with a reusable capability component loaded into the page of the shell web application.

FIG. 1 is a block diagram of a system 100 for sharing a reusable capability component 131 among multiple web applications, according to an embodiment of the disclosure. In the embodiment of FIG. 1, system 100 includes a device 101, a device 102, a base station 103, and a server 105. Device 101 can be a smart phone or a wireless device that wirelessly communicates with base station 103, and further commutatively coupled to server 105 through a cloud computing system 104. Device 102 can be commutatively coupled to server 105 by a wired connection or a wireless connection. System 100 is only for illustration purpose and is not limiting. There can be other configurations for system 100. For example, device 101 can be commutatively coupled to server 105 through a communication cable without going through base station 103 or cloud computing system 104.

In some examples, system 100 can include a network formed by some or all of device 101, device 102, server 105, base station 103, and cloud computing system 104. For example, system 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a Wi-Fi™ network, a WiMax™ network, any other type of network, or a combination of two or more such networks.

In some examples, base station 103 can include a node configured to operate based on a wide variety of wireless communication techniques such as, but not limited to, techniques based on 3GPP standards. For example, base station 103 can be a fixed station, and may also be called a base transceiver system (BTS), an access point (AP), a transmission/reception point (TRP), an evolved NodeB (eNB), a next generation node B (gNB), or some other equivalent terminology. System 100 can operate using both licensed cellular spectrum (known as in-band communication) and unlicensed spectrum (known as out-band communication).

In some examples, cloud computing system 104 can include an environment that delivers computing as a service, whereby shared resources, services, etc. Cloud computing system 104 can provide computation, software, data access, storage, and/or other services that do not require end-user knowledge of a physical location and configuration of a system and/or a device that delivers the services.

In some examples, device 101 and device 102 can be a wireless communication device, a smart phone, a laptop, a tablet, a personal assistant, a monitor, a wearable device, an Internet of Thing (IoT) device, a mobile station, a subscriber station, a desktop, a server, a remote terminal, a wireless terminal, or a user device. Device 101 can be configured to operate based on a wide variety of wireless communication techniques. These techniques can include, but are not limited to, techniques based on 3rd Generation Partnership Project (3GPP) standards using Rel-16, Rel-17 or later.

In some examples, server 105 can include a server device (e.g., a host server, a web server, an application server, etc.), a data center device, or a similar device. Server 105 can include a processor 151, an operating system 152, a storage 154 coupled to processor 151. Storage 154 can include a database 155, and reusable capability component 131. Reusable capability component 131 can include a frontend component 141 and a backend component 143 associated with frontend component 141 to provide data and functions for frontend component 141. Together, frontend component 141 and backend component 143 of reusable capability component 131 can form an independent web application. At deployment, frontend component 141 can be loaded into device 101, saved into a storage 114 of device 101 to become a frontend component 121, which is a copy of frontend component 141.

In some examples, frontend component 141 can include elements created using languages including Hypertext Markup Language (HTML), Extensible Hyper Text Markup Language (XHTML), Dynamic HTML (DHTML), Cascading Style Sheets (CSS), JavaScript™, or a scripting language. Backend component 143 can be created using language including Structured Query Language (SQL™), MySQL™, Hypertext Preprocessor (PHP™), Python™, Ruby on Rails™, Java™, or ASP.NET™.

In some examples, device 101 can include a processor 111, an operating system 112, storage device 114 coupled to processor 111, and a display device 115 coupled to processor 111 and storage device 114. Storage device 114 includes frontend component 121, which is a copy of frontend component 141 of reusable capability component 131. Processor 111 is configured to operate a web browser 116 to load at least a portion of a first web application 117 and render a first page 123 of the first web application 117 to be displayed on display device 115 at runtime of the first web application 117. The first page 123 includes a placeholder 127 to indicate a placement for reusable capability component 131, a route 126 to load reusable capability component 131, and one or more elements, e.g., an element 125, which are different from placeholder 127. For example, the one or more elements, e.g., element 125, can include at least a tab or a menu item. Router 126 can be a web address, e.g., a Uniform Resource Locator (URL) address, to load reusable capability component 131.

In some examples, web browser 116 can include Google Chrome™, Mozilla Firefox™, Microsoft Edge™, JioBrowser™, Opera Mini™, Internet Explorer™, Opera Mobile™, Baidu™, or NetSurf Safari™. The placement indicated by placeholder 127 includes a column, a layer, a frame, or an area occupied by frontend component 141 of reusable capability component 131. In some examples, the first page 123 containing placeholder 127 before reusable capability component 131 is loaded can be referred to as a shell page of the first web application 117. Similarly, the first web application 117 containing placeholder 127 before reusable capability component 131 is loaded is a shell web application.

In addition, processor 111 can be configured to detect a user navigation to placeholder 127 within the first page 123 at the runtime of the first web application 117, which is actually a shell web application. Upon the detection of the user navigation, processor 111 is configured to load from server 105 frontend component 141 of reusable capability component 131 to storage 114, and further render the frontend component 141 by web browser 116 and placed within the first page 123 according to the placement indicated by placeholder 127.

In some examples, device 102 can be a device similar to device 101. Device 102 can include a processor 113 and a display device 118 coupled to processor 113. Processor 113 can be configured to operate a web browser to load at least a portion of a second web application 119 and render a second page 124 of the second web application 119 to be displayed on display device 118 at runtime of the second web application 119. The second page 124 of the second web application 119 includes a second placeholder 128 to indicate a second placement within the second page 124 for reusable capability component 131. The second page 124 can also include the route to load reusable capability component 131, not shown. Hence, reusable capability component 131 is shared by the first web application 117 and the second web application 119.

In some examples, processor 113 is configured to detect a second user navigation to the second placeholder 128 within the second page 124 at the runtime of the second web application 119. Upon the detection of the second user navigation, processor 113 is configured to load frontend component 141 of reusable capability component 131 from server 105. Frontend component 141 of reusable capability component 131 is to be rendered by the web browser and placed within the second page 124 according to the second placement indicated by the second placeholder 128.

Figure 2:
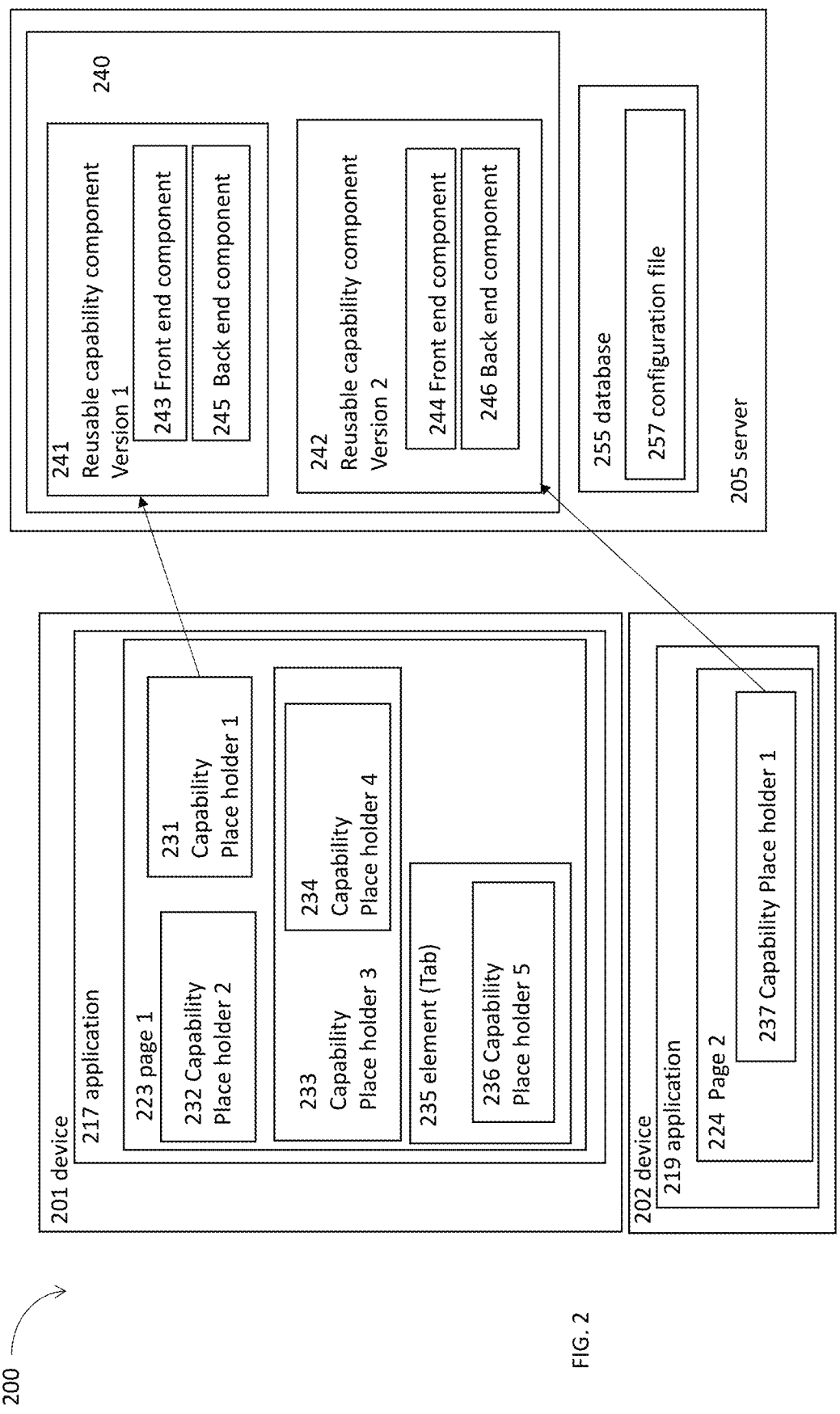
FIG. 2 illustrates a block diagram of another system for sharing a reusable capability component among multiple web applications, according to an embodiment of the disclosure.

FIG. 2 illustrates a block diagram of a system 200 for sharing a reusable capability component among multiple web applications, according to an embodiment of the disclosure. In the embodiment of FIG. 2, system 200 includes a device 201, a device 202, and a server 205, which can be examples of device 101, device 102, and server 105, respectively, as shown in FIG. 1.

In some examples, device 201 can include a processor configured to operate a web browser to load at least a portion of a first web application 217 and render a first page 223 of the first web application 217 to be displayed on a display device at runtime of the first web application 217.

The first page 223 can include a placeholder 231 to indicate a first placement of a reusable capability component, e. g., reusable capability component 240, a placeholder 232 to indicate a second placement of another reusable capability component, not shown. The first page 223 further includes one or more elements, e.g., an element 235, which are different from a placeholder. Element 235 can be a tab or a menu item. A placeholder 236 can be activated when element 235 is selected, and the frontend component of the reusable capability component corresponding to placeholder 236 can be loaded and rendered by the web browser and placed within the first page 223 according to the placement indicated by placeholder 236. The first page 223 can further include a placeholder 233, which is a parent placeholder to indicate the placement of a parent reusable capability component. Placeholder 233 can include a child placeholder 234 within placeholder 233, and the child placeholder 234 indicates a placement of a child reusable capability component.

In some examples, device 202 can include a processor configured to operate a web browser to load at least a portion of a second web application 219 and render a second page 224 of the second web application 219 to be displayed on a display device at runtime of the second web application 219. The second page 224 can include a placeholder 237 to indicate a placement of a reusable capability component, e. g., reusable capability component 240.

In some examples, reusable capability component 240 can have different versions, e.g., a first version 241 and a second version 242. The first version 241 can include a first version frontend component 243 and a first version backend component 245, while the second version 242 can include a second version frontend component 244 and a second version backend component 246. The first version frontend component 243 can include at least an element that is not included in the second version frontend component 244. Similarly, the first version backend component 245 can include at least a data or function that is not included in the second version backend component 246. The first page 223 includes placeholder 231 to indicate a placement of the first version frontend component 243 for reusable capability component 240, while the second page 224 includes placeholder 237 to indicate a placement of the second version frontend component 244 for reusable capability component 240.

In some examples, the first version frontend component 243, the second version frontend component 244, the first version backend component 245, and the second version backend component 246 are controlled by a configuration file 257 stored in a database 255 on server 205. Configuration file 257 determines to supply the first version frontend component 243 and the first version of the backend component 245 to the first web application 217 based on characteristics of the first web application 217. For example, the first web application 217 can be a web application providing truck sales to customers, and the second web application 219 can be a web application providing car sales to customers. The first version frontend component 243 provided to the first web application 217 can include an element showing the size of the truck bed, which is not included in second version frontend component 244. Configuration file 257 determines to supply the first version frontend component 243 and the first version of the backend component 245 to the first web application 217 for truck sales, but not for the second web application 219 providing car sales, since cars do not have truck bed.

Figure 3:
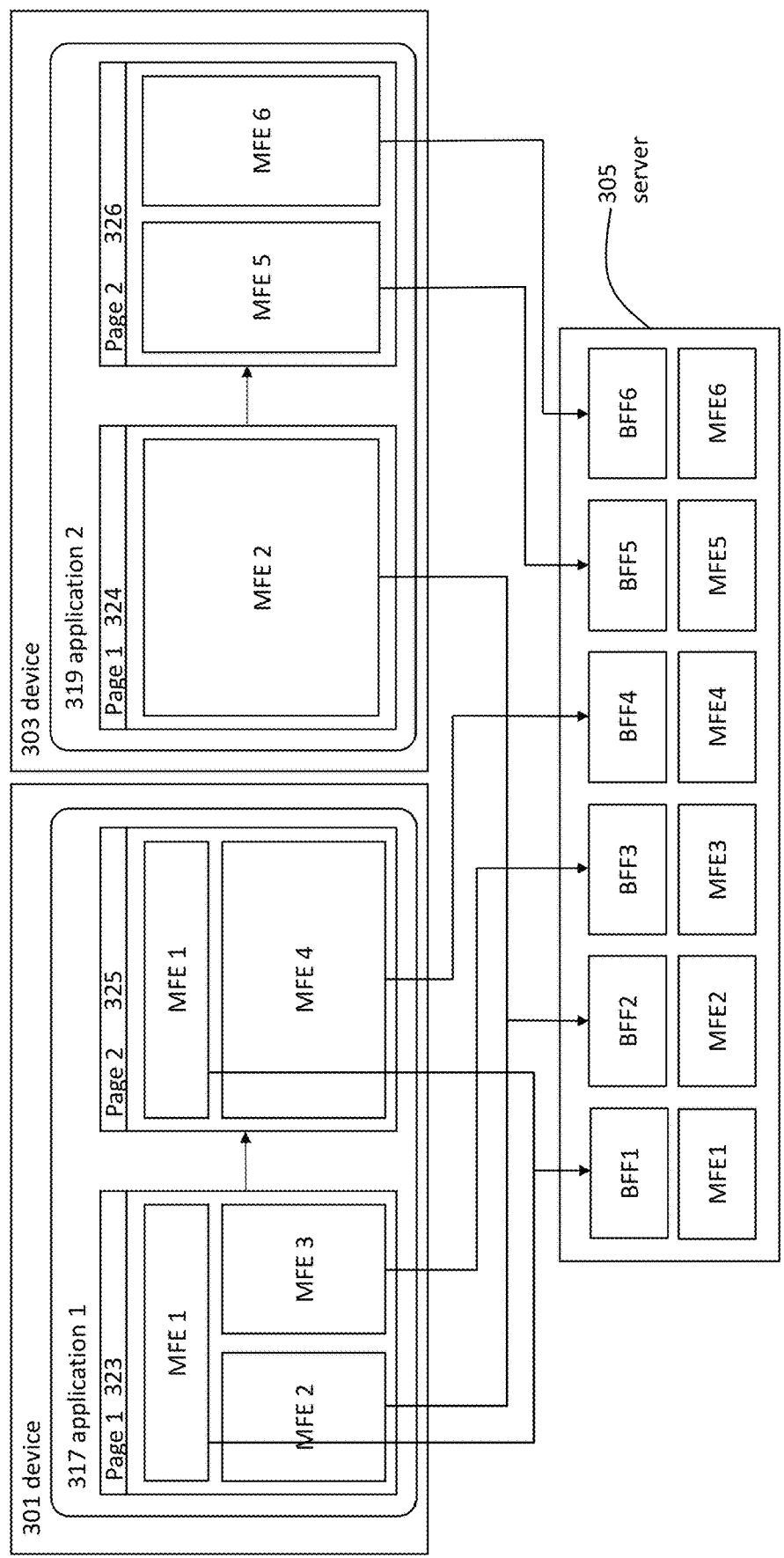
FIG. 3 illustrates two example web applications sharing various reusable capability components, according to an embodiment of the disclosure.

FIG. 3 illustrates two example web applications, e.g., a web application 317 and a web application 319, sharing various reusable capability components, according to an embodiment of the disclosure. In some examples, device 301 can include a processor configured to operate a web browser to load at least a portion of a web application 317, and device 303 can include a processor configured to operate a web browser to load at least a portion of a web application 319. Web application 317 and web application 319 can be examples of web application 117 and web application 119 as shown in FIG. 1, or examples of web application 217 and web application 219 as shown in FIG. 2. Web application 117 and web application 119 are shown in FIG. 1 as shell web applications since a placeholder is contained in web application 117 and web application 119 as shown. Similarly, web application 217 and web application 219 are shown in FIG. 2 as shell web applications since a placeholder is contained in web application 217 and web application 219 as shown. On the other hand, web application 317 and web application 319 are full web applications with frontend components of reusable capability components loaded into the web applications.

In some examples, web application 317 can include a first page 323 and a second page 325 to be displayed on a display device at runtime of the web application 317. The first page 323 can include a frontend component MFE1, a frontend component MFE2, and a frontend component MFE3. The second page 325 can include frontend component MFE1, and a frontend component MFE4. Web application 319 can include a first page 324 and a second page 326 to be displayed on a display device at runtime of the web application 319. The first page 324 can include frontend component MFE2. The second page 326 can include a frontend component MFE5, and a frontend component MFE6.

In some examples, a frontend component, e.g., frontend component MFE1, frontend component MFE2, frontend component MFE3, frontend component MFE4, frontend component MFE5, and/or frontend component MFE6, can include one or more micro frontend (MFE) components. A frontend component can have an associated or corresponding backend component, and both the frontend component and its associated backend component are stored on a server 305, while the frontend component can be further loaded into the web application to be rendered on a web page. For example, frontend component MFE1 has an associated backend component BFF1, frontend component MFE2 has an associated backend component BFF2, frontend component MFE3 has an associated backend component BFF3, frontend component MFE4 has an associated backend component BFF4, frontend component MFE5 has an associated backend component BFF5, and frontend component MFE6 has an associated backend component BFF6. A backend component, e.g., backend component BFF1, backend component BFF2, backend component BFF3, backend component BFF4, backend component BFF5, and/or backend component BFF6, can include one or more backend for frontends (BFF) components, or one or more micro service components. In some examples, a frontend component can be loaded from a software as a service (SaaS) server, e.g., server 305, and the backend component is provided by the SaaS server.

Frontend component MFE1 and backend component BFF1 together are shared by the first page 323 and the second page 325 of web application 317. Frontend component MFE2 and backend component BFF2 together are shared by the first page 323 of web application 317 and the first page 324 of web application 319. A frontend component of a reusable capability component can be placed in different ways on different web applications. For example, MFE2 is placed in the first page 323 of web application 317 in a way different from the way MFE2 is placed in the second page 324 of web application 319.

Figure 4:
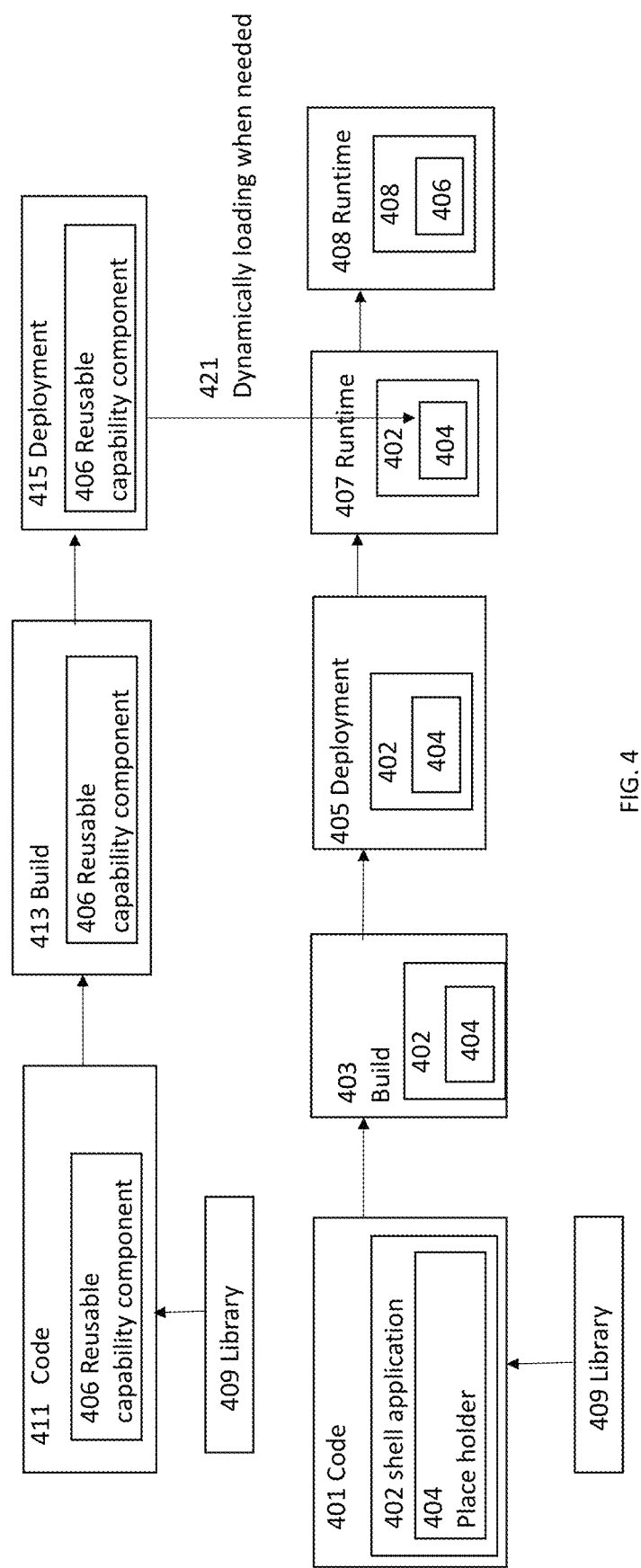
FIG. 4 illustrates an example process for a web application using a reusable capability component, according to an embodiment of the disclosure.

FIG. 4 illustrates an example process for a web application 402 using a reusable capability component 406, according to an embodiment of the disclosure. Web application 402 and reusable capability component 406 can be an example of web application 117 and reusable capability component 131, web application 119 and reusable capability component 131, web application 217 and reusable capability component 240, web application 219 and reusable capability component 240, web application 317 and reusable capability component MFE1 or MFE2, as shown in FIG. 1-3.

In some examples, web application 402 goes through multiple stages from the time a developer team starts to program web application 402 to the time a user can use web application 402. At code stage 401, web application 402 is programmed to contain a placeholder 404, hence web application 402 is a shell web application at this stage. Web application 402 can contain some code from a library 409. Library 409 can be viewed as a shared code or component at code stage 401. In addition, library 409 is typically code shared for the frontend component or the backend component, but can be a unit including both frontend and backend components as appropriate. The code for web application 402 and the library code can be bundled and compiled at build stage 403. After being built, at deployment 405, web application 402 is ready for deployment to a server and a client. For example, web application 402 can be deployed to a SaaS server. At runtime stage 407, web application 402 can be operated by a web browser to load at least a portion of web application 402, which can include placeholder 404. Accordingly, web application 402 including placeholder 404 at runtime is still a shell web application.

In some examples, reusable capability component 406 can be developed independently. Reusable capability component 406 can include a frontend component and a backend component. Together, the frontend component and the backend component of reusable capability component 406 can form an independent web application. Reusable capability component 406 is configured to be reusable by multiple web applications or by multiple parts of a web application. At code stage 411, reusable capability component 406 is programmed. In some example, reusable capability component 406 can include some part of library 409 as well. At build stage 413, reusable capability component 406 is compiled and built. At deployment stage 415, reusable capability component 406 can be deployed to a server, e.g., a SaaS server. Reusable capability component 406 can be deployed independently and separately from the deployment of web application 402. In some examples, reusable capability component 406 can be deployed in a server different from a server for the deployment of web application 402.

In some examples, at runtime of web application 402, which is still a shell web application, a user navigation upon placeholder 404 can be detected. Upon the detection of the user navigation, at stage 421, reusable capability component 406 can be loaded to the device and rendered into the page of web application 402 where placeholder 404 is located. After reusable capability component 406 is loaded into the placement indicated by placeholder 404, web application 402 enters stage 408 to be a full web application including all the functionalities provided by reusable capability component 406. Before reusable capability component 406 is loaded into the placement indicated by placeholder 404 at stage 408, web application 402 is a shell web application not including the functionalities provided by reusable capability component 406.

Reusable capability component 406 includes both a frontend component and a backend component to form an independent web application. Therefore, the reuse of reusable capability component 406 is at web application level, rather than just at frontend or backend component level. In addition, reuse of reusable capability component 406 does not happen until runtime when user navigation upon placeholder 404 can be detected.

Figure 5:
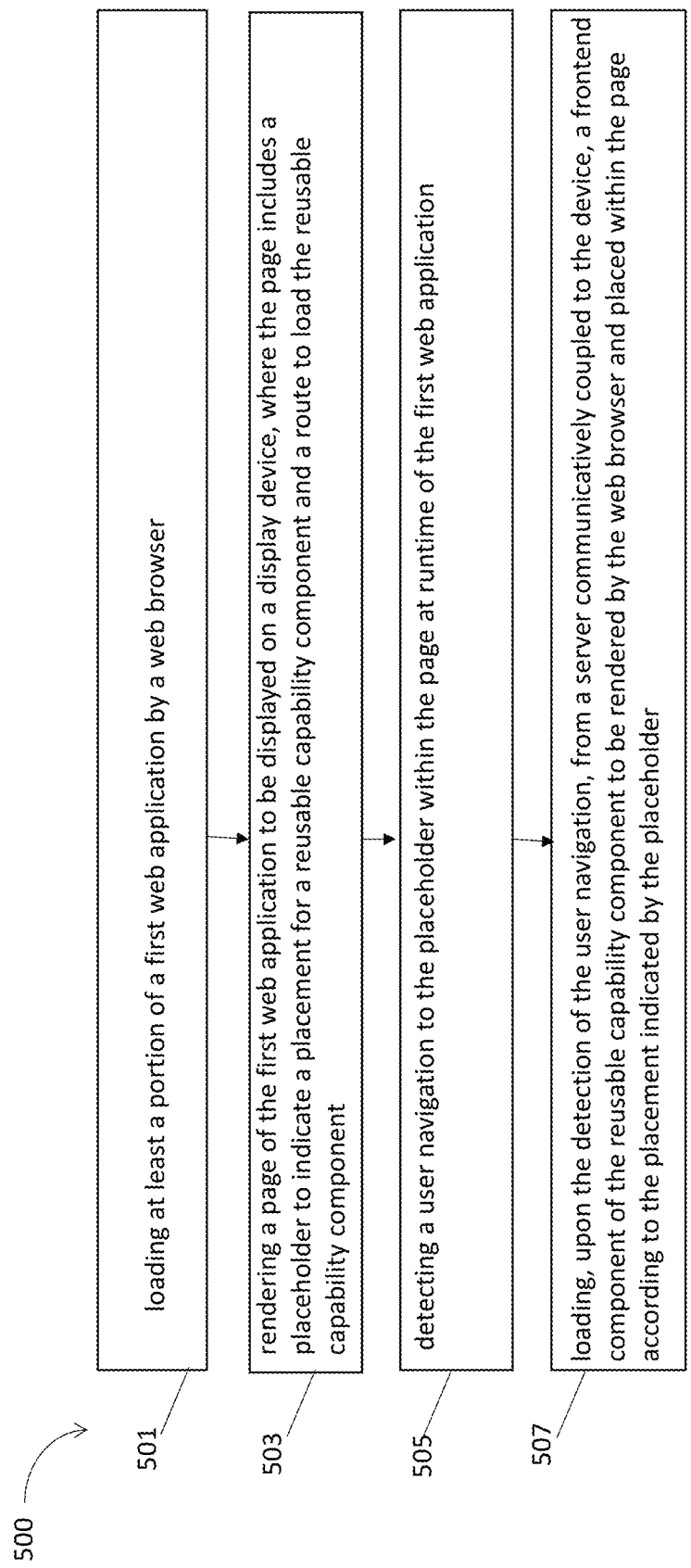
FIG. 5 illustrates an example process for a device operating a web browser to load a reusable capability component at a page of a web application according to a placeholder contained in the page, according to an embodiment of the disclosure.

FIG. 5 illustrates an example process 500 for a device operating a web browser to load a reusable capability component at a page of a web application according to a placeholder contained in the page, according to an embodiment of the disclosure. Process 500 can be performed by device 101, device 102, device 201, device 202, device 301, device 302, as shown in FIG. 1-3.

At 501, a device can load at least a portion of a first web application by a web browser. For example, device 101 can load at least a portion of the first web application 117 by web browser 116, as shown in FIG. 1.

At 503, the device can render a page of the first web application to be displayed on a display device, where the page includes a placeholder to indicate a placement for a reusable capability component and a route to load the reusable capability component. For example, device 101 can render page 123 of the first web application 117 to be displayed on display device 115. Page 123 includes placeholder 127 to indicate a placement for reusable capability component 131 and route 126 to load reusable capability component 131, as shown in FIG. 1.

At 505, the device can detect a user navigation to the placeholder within the page at runtime of the first web application. For example, device 101 can detect a user navigation to placeholder 127 within page 123 at runtime of the first web application 117, as shown in FIG. 1.

At 507, upon the detection of the user navigation, the device can load from a server communicatively coupled to the device a frontend component of the reusable capability component to be rendered by the web browser and placed within the page according to the placement indicated by the placeholder. For example, upon the detection of the user navigation to placeholder 127, device 101 can load from server 105 frontend component 141 of reusable capability component 131 to be rendered by web browser 116 and placed within page 123 according to the placement indicated by placeholder 127, as shown in FIG. 1.

Figure 6:
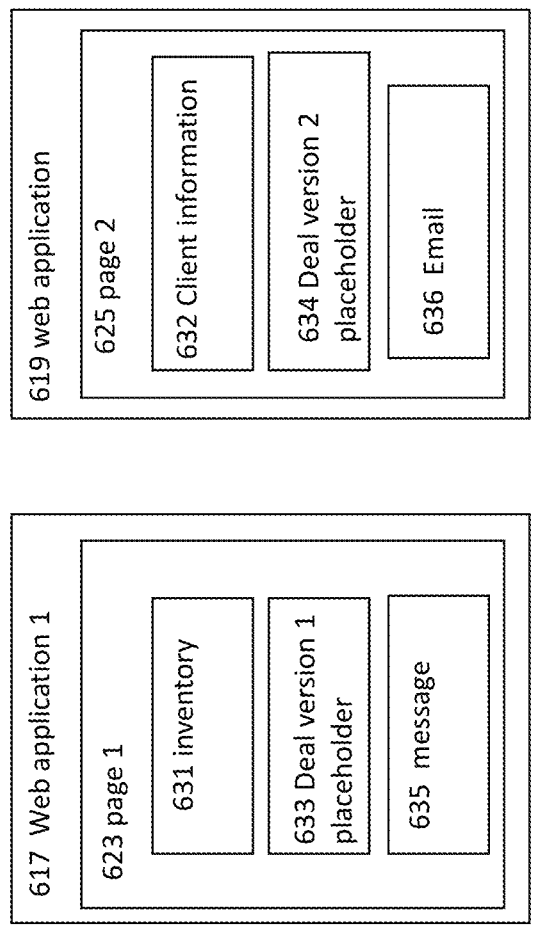
FIG. 6 illustrates two example web applications sharing various reusable capability components, according to an embodiment of the disclosure.

FIG. 6 illustrates two example web applications, e.g., a web application 617, and a web application 619, sharing a reusable capability component, according to an embodiment of the disclosure. In some examples, web application 617 can be loaded into a web browser, and display a page 623, and web application 619 can be loaded into a web browser and display a page 625. Web application 617 and page 623, web application 619 and page 625 can be examples of web application 117 and page 123, web application 119 and page 124, web application 217 and page 223, web application 219 and page 224, web application 317 and page 323, web application 319 and page 224, as shown in FIGS. 1-3.

In some examples, web application 617 can provide services to customers to shop for cars, and web application 619 can provide services to a manager of a car dealer company to manage customer relationship. Page 623 of web application 617 can include various components, e.g., an inventory component 631, a deal component 633, and a message component 635. Inventory component 631 can display various cars available for sale to customers. Deal component 633 can show various promotions available to the customers. In addition, message component 635 can enable customers to leave a message to the dealer. Inventory component 631, deal component 633, or message component 635 can include real code, or be a placeholder a frontend component of a reusable capability component. For example, inventory component 631 and message component 635 include real code, while deal component 633 includes a placeholder for a reusable capability component.

Page 625 of web application 619 can include various components, e.g., a client information component 632, a deal component 634, and an email component 636. Client information component 632 can include information about a client, such as phone number, name, contact, and more. Email component 636 can enable the manager to send an email to the client. Client information component 632, deal component 634, or email component 636 can include real code, or be a placeholder a frontend component of a reusable capability component. For example, client information component 632 and email component 636 include real code, while deal component 634 includes a placeholder for a reusable capability component.

Deal component 634 shows the currently available promotions to the customer. Deal component 634 of web application 619 can share a lot of information in common with deal component 633 of web application 617. Accordingly, deal component 634 and deal component 633 can share a same reusable capability component about deals. The shared reusable capability component about deals can include currently available cars on sale, its previous price and the sale price.

In some examples, deal component 634 and deal component 633 can be different versions of the reusable capability component about deals. Not every information about deals accessible to the manager should be accessible to the customers. For example, deal component 634 of web application 619 accessible to the manager can include how much profit each car can make at the sales price. Such a profit information may not be able to the customers, because such profit information can place the dealer in a disadvantage position in the negotiation of the car sales.

Figure 7:
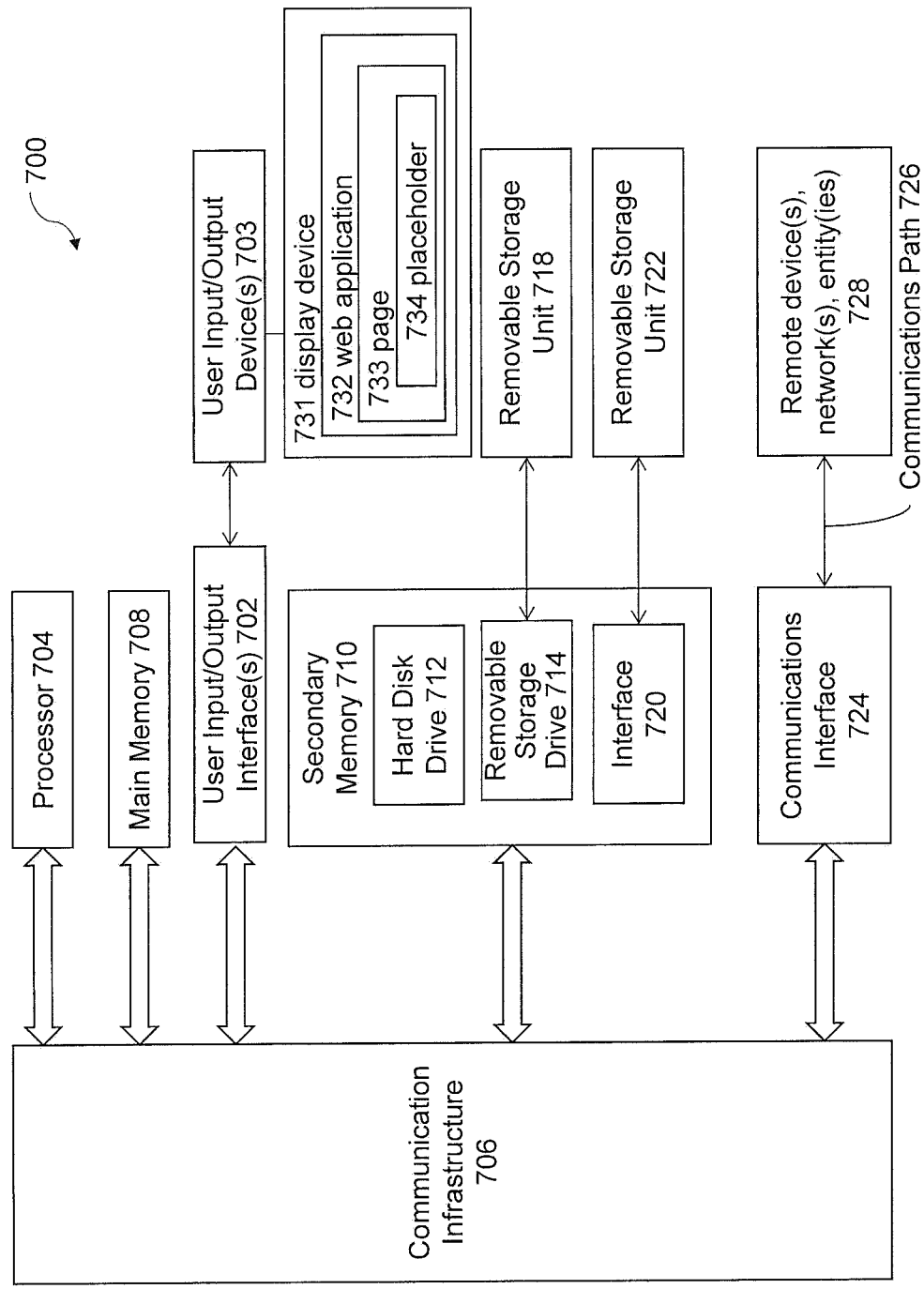
FIG. 7 is a computing environment suitable for implementing systems and methods of sharing a reusable capability component among multiple web applications, according to embodiments of the disclosure.

FIG. 7 depicts an example computer system 700 useful for implementing various embodiments. The computer system 700 may be an example of device 101, device 102, server 105 as shown in FIG. 1, device 201, device 202, server 205 as shown in FIG. 2, or device 301 and device 303 as shown in FIG. 3.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure or bus 706 through user input/output interface(s) 702.

In some example, user input/output device(s) 703 can include a display device 731. Processor 704 can be configured to operate a web browser to load at least a portion of a web application 732 and render a page 733 of the web application 732 to be displayed on display device 731 at runtime of the web application 732. Page 733 includes a placeholder 734 to indicate a placement for reusable capability component. Display device 731, web application 732, page 733, and placeholder 734 can be examples of display device 115, web application 117, page 123, and placeholder 127 as shown in FIG. 1, display device 118, web application 119, page 124, and placeholder 128 as shown in FIG. 1.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON™), Extensible Markup Language (XML), Yet Another Markup Language (YAML), Extensible Hypertext Markup Language (XHTML), Wireless Markup Language (WML™), MessagePack, XML User Interface Language (XUL™), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the present application as contemplated by the inventor(s), and thus, are not intended to limit the present application and the appended claims in any way.

The present application has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the application that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present application should not be limited by any of the above-described exemplary embodiments and should be defined only in accordance with the following claims and their equivalents.

What is claimed is:

1. A client device, comprising:
a display device configured to display a page of a first web application rendered by a web browser at runtime of the first web application, wherein the page includes a placeholder to indicate a placement for a reusable capability component and a route to load the reusable capability component from a server communicatively coupled to the client device;
a processor coupled to the display device, and configured to:
operate the web browser to load at least a portion of the first web application and render the page of the first web application to be displayed on the display device;
detect a user navigation to the placeholder within the page at the runtime of the first web application;
load, utilizing the route upon the detection of the user navigation, a frontend component of the reusable capability component from the server, wherein the frontend component is configured to be rendered by the web browser and placed within the page according to the placement indicated by the placeholder, wherein the reusable capability component comprises the frontend component and a backend component associated with the frontend component to provide data and functions for the frontend component, wherein the frontend component and the backend component of the reusable capability component form an independent web application; and
operate the web browser to load a second web application and render a second page of the second web application at runtime of the second web application, wherein the second page of the second web application includes a second placeholder to indicate a second placement within the second page for the same reusable capability component and the same route to load the same reusable capability component from the server, wherein the first web application executed by the client device at client side includes a first component to provide a first service, and the second web application executed by the client device at client side includes a second component different from the first component to provide a second service different from the first service.

2. The client device of claim 1, wherein the processor is further configured to:
detect a second user navigation to the second placeholder within the second page at the runtime of the second web application; and
load, upon the detection of the second user navigation, the frontend component of the reusable capability component from the server, wherein the frontend component of the reusable capability component is to be rendered by the web browser and placed within the second page according to the second placement indicated by the second placeholder.

3. The client device of claim 2, wherein the frontend component of the reusable capability component loaded into the page of the first web application is a first version of the frontend component of the reusable capability component that is associated with a first version of the backend component of the reusable capability component, and the frontend component of the reusable capability component loaded into the second page of the second web application is a second version of the frontend component of the reusable capability component that is associated with a second version of the backend component of the reusable capability component,
wherein the first version of the frontend component includes at least an element that is not included in the second version of the frontend component, or the first version of the backend component includes at least a data or function that is not included in the second version of the backend component.

4. The client device of claim 3, wherein the first version of the frontend component, the second version of the frontend component, the first version of the backend component, and the second version of the backend component are controlled by a configuration file stored in a database on the server, and the configuration file determines to supply the first version of the frontend component and the first version of the backend component to the first web application based on characteristics of the first web application.

5. The client device of claim 1, wherein the page of the first web application further includes one or more elements rendered within the page, and the one or more elements are different from the placeholder.

6. The client device of claim 5, wherein the one or more elements includes at least a tab or a menu item, and the placeholder is activated when the tab or the menu item is selected, and the frontend component of the reusable capability component is loaded and rendered by the web browser and placed within the page according to the placement indicated by the placeholder.

7. The client device of claim 1, wherein the placeholder is a parent placeholder to indicate a placement of a parent reusable capability component, and the parent placeholder further includes a child placeholder within the parent placeholder, and wherein the child placeholder indicates a placement of a child reusable capability component.

8. The client device of claim 1, wherein the placeholder is a first placeholder to indicate a first placement of a first reusable capability component, and the page further includes a second placeholder to indicate a second placement of a second reusable capability component, wherein the first placement is different from the second placement.

9. The client device of claim 1, wherein the placement indicated by the placeholder includes a column, a layer, a frame, or an area occupied by the frontend component.

10. The client device of claim 1, wherein the frontend component includes elements created using languages including a scripting language and wherein the backend component is created using language including a database language.

11. The client device of claim 1, wherein the client device includes a smart phone, a laptop, a tablet, a personal assistant, a monitor, a wearable device, an Internet of Thing (IoT) device, a mobile station, a subscriber station, a desktop, a server, a remote terminal, a wireless terminal, or a user device.

12. The client device of claim 1, wherein variables and parameters of the reusable capability component are independent of variables or parameters of the first web application and the second web application.

13. A method performed by a client device, comprising:
loading at least a portion of a first web application by a web browser;
rendering a page of the first web application to be displayed on a display device during runtime of the first web application, wherein the page includes a placeholder to indicate a placement for a reusable capability component and a route to load the reusable capability component from a server communicatively coupled to the client device;
detecting a user navigation to the placeholder within the page at the runtime of the first web application;
loading, utilizing the route upon the detection of the user navigation, a frontend component of the reusable capability component from the server, wherein the frontend component is configured to be rendered by the web browser and placed within the page according to the placement indicated by the placeholder, wherein the reusable capability component comprises the frontend component and a backend component associated with the frontend component to provide data and functions for the frontend component, wherein the frontend component and the backend component of the reusable capability component form an independent web application;
loading at least a portion of a second web application by the web browser; and rendering a second page of the second web application to be displayed on the display device at runtime of the second web application, wherein the second page includes a second placeholder to indicate a second placement for the same reusable capability component and the same route to load the same reusable capability component from the server, wherein the first web application executed by the client device at client side includes a first component to provide a first service, and the second web application executed by the client device at client side includes a second component different from the first component to provide a second service different from the first service.

14. The method of claim 13, wherein the page and the placeholder within the page of the first web application are a first page and a first placeholder to indicate a first placement, and the method further comprises:
detecting a second user navigation to the second placeholder within the second page at the runtime of the second web application; and
loading, upon the detection of the second user navigation, the frontend component of the reusable capability component from the server, wherein the frontend component of the reusable capability component is to be rendered by the web browser and placed within the second page according to the second placement indicated by the second placeholder.

15. The method of claim 14, wherein the frontend component of the reusable capability component loaded into the page of the first web application is a first version of the frontend component of the reusable capability component that is associated with a first version of the backend component of the reusable capability component, and the frontend component of the reusable capability component loaded into the second page of the second web application is a second version of the frontend component of the reusable capability component that is associated with a second version of the backend component of the reusable capability component,
wherein the first version of the frontend component includes at least an element that is not included in the second version of frontend component, or the first version of the backend component includes at least a data or function that is not included in the second version of backend component.

16. The method of claim 13, wherein the page of the first web application further includes one or more elements rendered within the page, and the one or more elements are different from the placeholder; and
wherein the one or more elements includes at least a tab or a menu item, and the placeholder is activated when the tab or the menu item is selected, and the frontend component of the reusable capability component is loaded and rendered by the web browser and placed within the page according to the placement indicated by the placeholder.

17. A non-transitory computer-readable device having instructions stored thereon that, when executed by at least one computing device, cause the at least one computing device to perform operations comprising:
loading at least a portion of a first web application by a web browser;
rendering a page of the first web application to be displayed on a display device during runtime of the first web application, wherein the page includes a placeholder to indicate a placement for a reusable capability component and a route to load the reusable capability component from a server communicatively coupled to the at least one computing device;

detecting a user navigation to the placeholder within the page at the runtime of the first web application;

loading, utilizing the route upon the detection of the user navigation, a frontend component of the reusable capability component from the server, wherein the frontend component is configured to be rendered by the web browser and placed within the page according to the placement indicated by the placeholder, wherein the reusable capability component comprises the frontend component and a backend component associated with the frontend component to provide data and functions for the frontend component, wherein the frontend component and the backend component of the reusable capability component form an independent web application;

loading at least a portion of a second web application by the web browser; and rendering a second page of a second web application to be displayed on the display device at runtime of the second web application, wherein the second page includes a second placeholder to indicate a second placement for the same reusable capability component and the same route to load the same reusable capability component from the server, wherein the first web application when executed by the computing device at client side includes a first component to provide a first service, and the second web application when executed by the computing device at client side includes a second component different from the first component to provide a second service different from the first service.

18. The non-transitory computer-readable medium of claim 17, wherein the page and the placeholder within the page of the first web application are a first page and a first placeholder to indicate a first placement, and the at least one computing device performs operations further comprising:

detecting a second user navigation to the second placeholder within the second page at the runtime of the second web application; and loading, upon the detection of the second user navigation, the frontend component of the reusable capability component from the server, wherein the frontend component of the reusable capability component is to be rendered by the web browser and placed within the second page according to the second placement indicated by the second placeholder.

19. The non-transitory computer-readable medium of claim 17, wherein the frontend component includes one or more micro frontend components, and the backend component includes one or more backend for frontends (BFF) components, or one or more micro service components.

20. The non-transitory computer-readable medium of claim 17, wherein the frontend component is loaded from a software as a service (SaaS) server, and the backend component is provided by the SaaS server.

* * * * *